Sept. 26, 1967     T. J. LUND     3,344,419

WIDE ANGLE MEASUREMENT OF TERRAIN REFLECTIVITY

Filed Nov. 22, 1965

Fig. 3    $f_d = \frac{2V}{\lambda} \sin \theta$

INVENTOR.
THOMAS J. LUND
BY
Knox & Knox

3,344,419
WIDE ANGLE MEASUREMENT OF TERRAIN REFLECTIVITY

Thomas J. Lund, San Diego, Calif., assignor to The Ryan Aeronautical Co., San Diego, Calif.
Filed Nov. 22, 1965, Ser. No. 508,952
6 Claims. (Cl. 343—5)

ABSTRACT OF THE DISCLOSURE

This invention measures the terrain reflectivity of radar signals directed at angles of incidence relative to a vertical line running from an aircraft to the ground to develop a plurality of curves giving the reflectivity of radar signals at various angles to the aircraft for different terrains.

---

Figure 1:
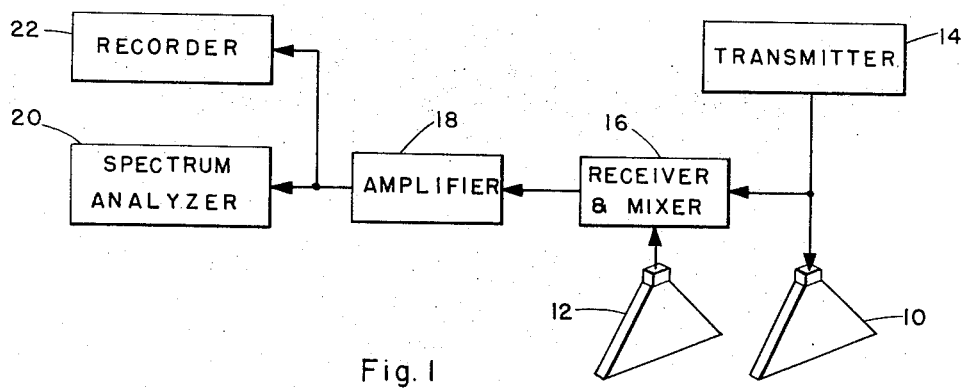

The technique of measuring reflectivity or back-scattering of radar from various terrain surfaces has been used to provide basic data for the design of terrain avoidance, navigational, mapping and similar apparatus employing radar. The measurement made is the backscattering cross section per unit of surface area and must be measured at various angles of incidence with respect to the moving vehicle. Previous techniques have involved making repeated passes in an aircraft over the same terrain with a narrow beam antenna set at a different angle of incidence at each pass, in order to build up a total spectrum of reflectivity. This is tedious and often inaccurate, since it is difficult to fly precisely over the same strip of terrain on each pass and, over water, the reflectivity may vary between passes due to surface disturbances.

The primary object of this invention is to provide a reflectivity measuring system and operating technique with which terrain reflectivity can be measured in a continuous spectrum, over a wide range of angles of incidence, in a single pass over the terrain of interest.

Another object of this invention is to provide a reflectivity measuring system utilizing a shaped beam of radiation elongated in the direction of motion, the Doppler shift of the return signal being used to identify specific portions of the beam at their particular angles of incidence, so that the return signal spectrum can be analyzed incrementally.

Another object of this invention is to provide reflectivity measuring means utilizing conventional radar apparatus in a simple and compact installation, adaptable to various aircraft in addition to or in combination with existing equipment.

Figure 2:
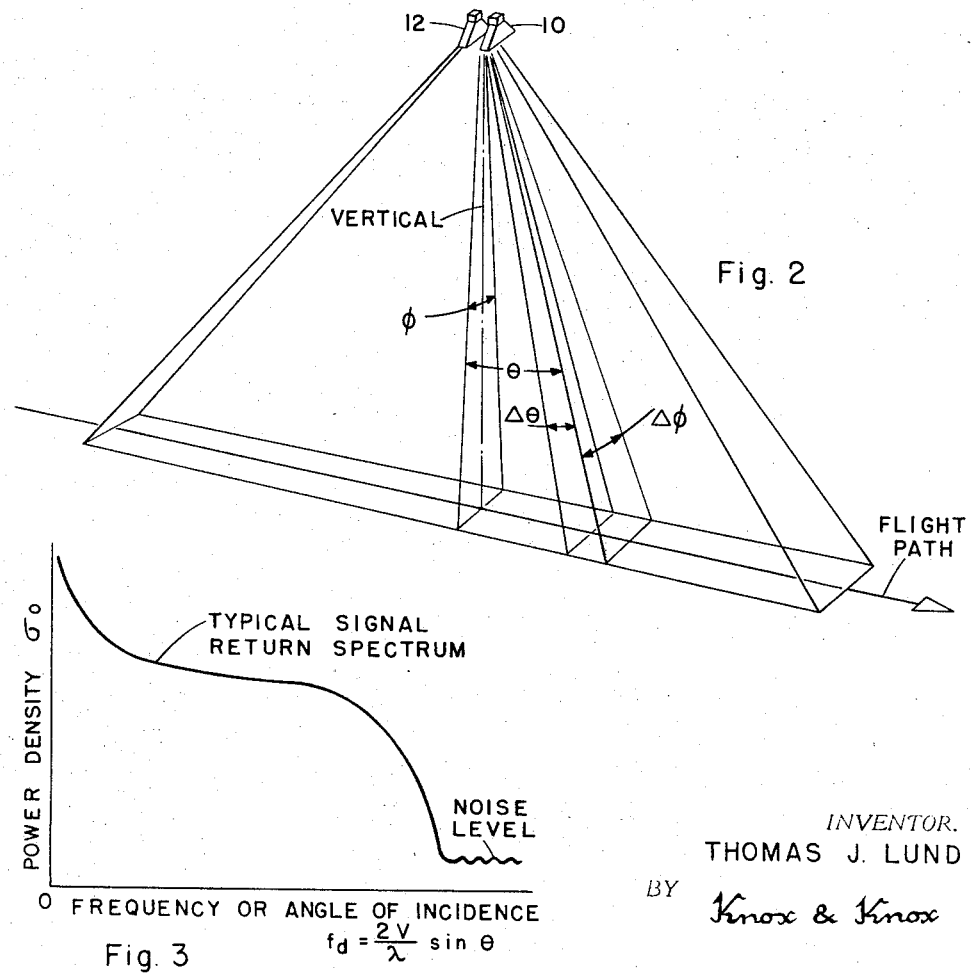

The apparatus and measuring technique are illustrated in the drawing, in which:

FIGURE 1 is a diagram of the apparatus;
FIGURE 2 is a diagram of the beam pattern and measurements used; and
FIGURE 3 is a graph of a typical return signal.

The apparatus to be carried in an airborne vehicle, includes a transmitter antenna 10 and a receiver antenna 12, similarly shaped to provide a wide angle beam of narrow width, the beam being elongated along the longitudinal axis of the vehicle. The beam thus illuminates the terrain in a long narrow, substantially rectangular pattern, extending along the flight path immediately beneath the vehicle. This is distinct from the usual wide area mapping or side looking radar which uses a beam having its greatest width transverse to the aircraft. While the limits of the beam are not critical, a typical beam subtends an angle of about 120 degrees in the longitudinal direction and about 3 degrees laterally. Horn type antennas are indicated, but other types capable of producing the required beam pattern may be equally suitable.

Antenna 10 is fed by a transmitter 14 providing continuous wave or suitably modulated radio frequency energy of closely controlled frequency. A portion of the transmitted energy is fed, together with the output from the receiver antenna 12, to a receiver and mixer 16. The mixer compares the transmitted and reflected signals and provides a Doppler spectrum corresponding to the motion of the vehicle, the Doppler shift being dependent on the angle of incidence at the various portions of the beam and the signal intensity being dependent on surface reflectivity. The return signal spectrum is fed through an amplifier 18 to a spectrum analyzer 20 and a recorder 22, which may be a combination instrument. Several types of spectrum analyzers and recorders, capable of analyzing a complete signal spectrum and recording the results graphically or in some other form of data, are well known.

In operation the transmitter antenna 10 emits the wide angle beam, as in FIGURE 2, the correspondingly shaped receiver antenna picking up the return signal from the same zone. The beam extends along the flight path, directly below the vehicle and is distributed to the front and rear of the vertical. The rearward portion of the beam is not essential, but is preferable in most instances to provide a more complete spectrum for analysis and comparison.

The backscattered power density $S^s$, from a single scattering element, is related to the transmitted or incident power density $S^i$, by $$S^s = S^i \frac{\sigma}{4\pi R^2} \quad (1)$$

where $\sigma$ is the backscattering cross section, defined as the area, normal to the axis of the beam, intercepting that amount of power which, when scattered isotropically, produces an echo equal to that observed from the target. The quantity $\sigma_0$ is defined as the average backscattering cross section per unit surface area, by $$\sigma_0 = \frac{\bar{\sigma}}{\text{Area illuminated}} \quad (2)$$

where:
- $P_T$ = Transmitted power
- $G_O$ = Antenna gain
- $\lambda$ = Wavelength
- $R$ = Range to surface increment
- $\theta$ = Angle of incidence
- $\sigma_0(\theta\phi)$ = Backscattering cross section per unit surface area at coordinates $\theta$ and $\phi$
- $f(\theta\phi)$ = Two-way antenna pattern factor, the amount of power received from an incremental area on the surface bounded by the angles $$\left(\theta - \frac{\Delta\theta}{2} \text{ to } \theta + \frac{\Delta\theta}{2}\right) \text{ and } \left(\phi - \frac{\pi}{2} \text{ to } \phi + \frac{\pi}{2}\right) \quad (3)$$

may be expressed as follows:

$$\Delta P = \frac{P_T G_O^2 \lambda \sigma_0(\theta\phi)}{(4\pi)^3 R^2 \cos\theta} \int_{\theta - \frac{\Delta\theta}{2}}^{\theta + \frac{\Delta\theta}{2}} \int_{-\frac{\pi}{2}}^{+\frac{\pi}{2}} f(\theta\phi) d\theta d\phi \quad (4)$$

Since the two-way antenna beamwidth has its wide dimension $\theta$ in the direction of motion, the pattern parameter $f(\theta\phi)$ will be a slowly changing function of $\theta$ and the integrals above may be written as follows:

$$\int_{\theta - \frac{\Delta\theta}{2}}^{\theta + \frac{\Delta\theta}{2}} \int_{-\frac{\pi}{2}}^{+\frac{\pi}{2}} f(\theta\phi) d\theta d\phi = f(\theta) \Delta\theta \int_{-\frac{\pi}{2}}^{+\frac{\pi}{2}} f_1(\theta\phi) d\phi \quad (5($ where $$f(\theta\phi) = f(\theta)f_1(\theta\phi) \quad (6)$$

The Doppler shift of the return signal will vary through the beam pattern in the direction of motion in relation to the angle of incidence. A greater shift will be incurred from the forward portion of the beam relative to the portion near the vertical, due to the difference in relative closing rates. The power picked up by the receiving antenna will also vary in a similar manner according to the angle of incidence, since the reflection from an area immediately below the vehicle will return more completely to the antenna than that directed at an angle to vertical. Thus the amount of received power can be written as a function of frequency by substituting the equivalent increment of frequency for the angular increment $\Delta\theta$. For the beam configuration illustrated in FIGURE 2, the Doppler frequency $f_d$ can be expressed in terms of velocity V, by $$f_d = \frac{2V}{\lambda} \sin \theta \quad (7)$$

and $$\frac{df_d}{d\theta} = \frac{2V}{\lambda} \cos \theta, \quad \frac{d\theta}{df_d} = \frac{\lambda}{2V \cos \theta} \quad (8)$$

An angular increment of $\lambda/2V \cos \theta$ radians is thus equivalent to a frequency increment of 1 cycle per second. The amount of return signal power received in an increment of frequency 1 cycle per second wide will be referred to as the signal power density $W(f_d)$, and may be written as follows:

$$W(f_d) = \frac{P_T G_0^2 \lambda^3 \sigma_0(\theta\phi) f(\theta)}{(4\pi)^3 2Vh^2} \int_{-\frac{\pi}{2}}^{+\frac{\pi}{2}} f_1(\theta\phi) d\phi \quad (9)$$

where the range R has been converted to altitude $h$, as follows:

$$h^2 = R^2 \cos^2 \theta \quad (10)$$

For values of $\theta$ in excess of a few degrees, $\sigma_0(\theta\phi)$ becomes equal to $\sigma_0(\theta)$. If the beamwidth in the dimension $\phi$ is 2.5 degrees, an angular error of only 8% results from approximating the $(\theta\phi)$ angular dependence to a $(\theta)$ dependence at $\theta=3$ degrees, and becomes smaller as $\theta$ increases. A small zone of uncertainty exists in the immediate vicinity of the antenna beam vertical which will not be a particular disadvantage in some uses. To obtain full data coverage for record purposes, the value of $\sigma_0$ can be determined effectively down to zero angle of incidence by placing the vehicle in a shallow glide position, so that a velocity component exists along the antenna vertical. At a glide angle of 10 degrees, the zone of uncertainty then existing would be at the position of a normal angle of incidence of 10 degrees, where accurate data can be obtained in level flight.

With direct-to-audio signal detection, a folding over of the power spectrum will occur about zero Doppler frequency, resulting in a summing of the signal power from an increment of angle in the forward looking portion of the beam with signal power from the corresponding angular increment in the rearward looking portion of the beam. The actual value of the backscattering cross section per unit surface area, $\sigma_0(\theta)$, can be determined from flight test recordings of the signal power density received at a predetermined altitude $h$, according to the following:

$$\sigma_0(\theta) = \frac{W(fd)(4\pi)^3 h^2 V}{P_T G_0^2 \lambda^3 f(\theta)} \int_{-\frac{\pi}{2}}^{+\frac{\pi}{2}} f_1(\theta\phi) d\phi \quad (11)$$

The functions $f(\theta)$ and $f_1(\theta\phi)$ are taken directly from the antenna beam pattern data. The integration of $f(\theta\phi)$ over the coordinate $\phi$ may be done numerically, or by approximating the function by an integratable expression.

Power density $\sigma_0$ at any frequency $f_d$ is a factor of the power returned at a specific angle of incidence $\theta$, according to Equation 7, above. Thus the Doppler shift frequency provides one ordinate of a spectrum and the signal strength or power density provides the other.

A typical return signal spectrum is given in FIGURE 3, the power density per unit surface area being maximum near vertical, or zero angle of incidence, then decreasing gradually with a fairly sharp drop off at the limits of the antenna beam. This is an average spectrum for smooth terrain and will vary for different surface characteristics. Sudden changes in surface contours will produce anomalies moving through the spectrum and exhibiting their particular reflectivity characteristics at different angles of incidences as the vehicle moves. Over water, disturbances from waves, the wake of a ship, slick or other sources would be readily apparent.

The system can be used to measure terrain reflectivity generally, or over specific tracks to provide data which would assist in navigation, mapping, terrain avoidance and similar operations. In the navigational aspect, in particular, the system could operate in direct conjunction with a Doppler navigation system, to provide corrective data for inconsistencies in the Doppler signals caused by terrain irregularities. For oceanographic work or navigation over water, the sea state is accurately represented. The system is adaptable to aircraft, or to space vehicles moving over the surface of the earth or other planets and is effective at any altitude within the useful range of the radar used.

It is understood that minor variation from the form of the invention disclosed herein may be made without departure from the spirit and scope of the invention, and that the specification and drawing are to be considered as merely illustrative rather than limiting.

I claim:

1. Reflectivity measuring apparatus for mounting in an airborne vehicle to measure the back-scattering cross section per unit surface area of the terrain below the vehicle, the apparatus comprising:
    a transmitter having a radio frequency output of known frequency;
    means to direct an output signal from said transmitter to the terrain in a beam having a wide angle dispersion on the order of 45–120 degrees in the direction of motion of the vehicle and a narrow angle dispersion transverse to the direction of motion;
    receiving means to receive the reflected signal in a corresponding beam pattern;
    analyzing means coupled to said receiving means to analyze the Doppler shift spectrum of the return signal over the entire beam pattern, and to analyze simultaneously the power density of the return signal at all portions of the beam.

2. Apparatus according to claim 1, wherein said means to direct, and said receiving means, include a pair of similar beam shaping antennas correspondingly oriented in the vehicle.

3. Apparatus according to claim 1, wherein said means to receive includes a mixer coupled to said transmitter to receive a portion of the output signal for comparison with the reflected signal.

4. Apparatus according to claim 1, and including a recorder coupled to said analyzing means to record the Doppler shift spectrum in relation to the power density spectrum.

5. The method of making a plurality of curves giving the reflectivity of radar signals at various angles of incidence to an airborne vehicle over a given terrain comprising the steps of:
    directing toward the terrain a radio frequency signal of known frequency in a beam pattern having a wide angle dispersion on the order of 45–120 degrees in the direction of motion of the vehicle and a narrow angle of dispersion transverse to the direction of motion;

receiving the reflected signal in a corresponding beam pattern;

and recording the Doppler shift spectrum of the reflected signal relative to the transmitted signal over the entire beam pattern while simultaneously recording the power density of the reflected signal over the entire beam pattern.

6. The method according to claim 5 and including the further step of recording the Doppler shift spectrum and power density spectrum in relation to each other.

References Cited
UNITED STATES PATENTS 3,222,673  12/1965  Friedrich _____ 343—8

RODNEY D. BENNETT, *Primary Examiner.*

C. L. WHITHAM, *Assistant Examiner.*